June 2, 1936. C. H. ERNE 2,042,459
LIQUID DISPENSER
Filed July 3, 1933
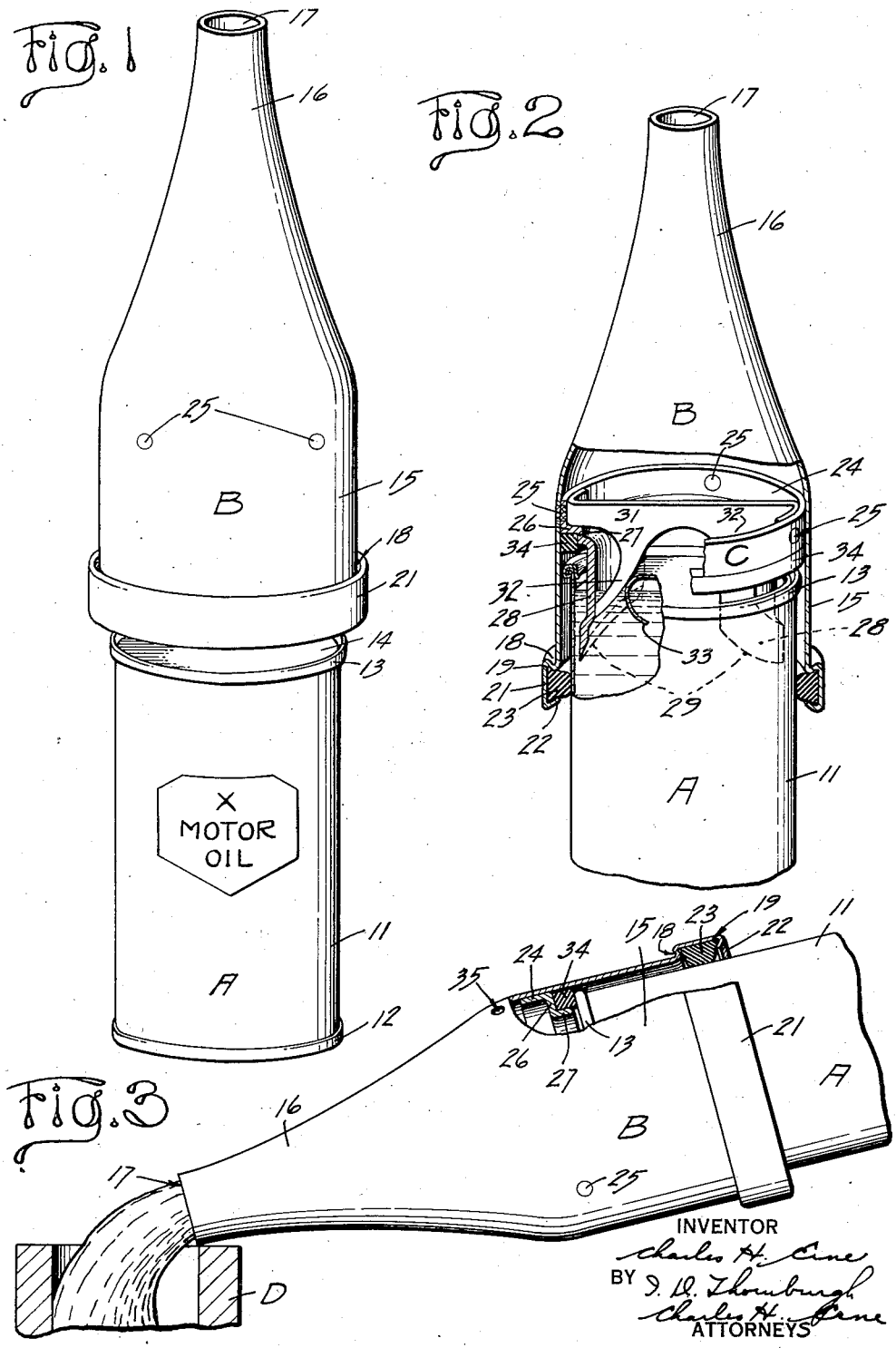
INVENTOR
Charles H. Erne
BY J. D. Thornburgh
Charles H. Erne
ATTORNEYS Patented June 2, 1936

2,042,459

UNITED STATES PATENT OFFICE 2,042,459

LIQUID DISPENSER

Charles H. Erne, Maywood, N. J., assignor to American Can Company, New York, N. Y., a corporation of New Jersey Application July 3, 1933, Serial No. 678,949

4 Claims. (Cl. 221—23)

This invention relates in general to an improved method and device for dispensing liquids and more particularly to expeditiously dispensing a unit charge of lubricating oil from a sealed, tamperproof container, which is destroyed during the dispensing operation.

The principal object of the invention is to provide a frangible oil container of sheet metal and/or fibre adapted to be sealed in a liquid tight and tamperproof manner, in combination with a simple, inexpensive funnel spout having an opening device therein which comes into cutting operation while the funnel spout is inverted over the oil container and is in liquid tight sealing engagement with the container, so that a unit charge of oil may be readily dispensed from the container through the funnel spout and directly into the filling opening of an automobile crank case or other ultimate place of deposit.

An important object of the invention is the provision of a novel method of dispensing branded or labeled motor oils in sealed, tamperproof containers in an expeditious and economical manner, which method is designed to substantially prevent substitution and adulteration of the oils and to protect the ultimate purchaser against adulterated and inferior quality.

Another important object of the invention is the provision of a combination pouring spout and funnel, shaped and dimensioned so as to conduct and transfer liquids, such as lubricating oils, from a substantially widely opened container to a more or less restricted opening in the ultimate place of deposit, such as the filling holes of automobile crank cases, which differ in size and accessibility according to different makes and sizes of cars, and to make such transfer speedily and with a minimum waste of oil and motion and with a minimum soiling of the devices involved.

Still another important object of the invention is the provision of such a combination pouring spout, delivery funnel and opening device provided with a container engaging sealing gasket or packing and adapted to sealingly telescope over a filled oil container and simultaneously open and destroy the container.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a suitable oil container and funnel spout in superposed alignment;

Fig. 2 is a perspective view of the container, funnel spout and cutter, with parts broken away and parts in section to show details of construction; and Fig. 3 is a partly sectional, partly elevational view showing the assembled container and funnel spout cutter in tilted or pouring position.

The preferred embodiment of the invention illustrated in the drawing comprises generally a sheet metal container A, a substantially bottle shaped funnel spout B and a container opening device or cutter C.

Preferably, the container A is an ordinary tin can produced by the automatic machinery now in general use and is of a size to hold an exact unit charge of lubricating oil, for example a quart. It may, however, be made in a number of different sizes, for instance, half gallon, gallon or five quart size, or any other desired size.

The container A shown on the drawing is formed from sheet metal, such as tin plate, and comprises a cylindrical body 11, having a bottom end secured to it in any suitable liquid tight manner, as by means of a double seam 12. A top end is secured to the body 11 by a like seam 13 and has a countersunk wall or panel 14.

It will be readily understood that the container A may also be made entirely of fibre, suitably oil proofed, or it may take the form of a fibre body with metal ends. The materials used are inconsequential so long as the container is sealed in a liquid tight and tamperproof manner. In order to assure the ultimate purchaser that he received the brand and quality of lubricating oil he asks and pays for, the oil container A may be marked with the brand of oil it contains, by lithographing or labeling or in any other suitable manner. Fig. 1 shows an example of such marking.

The funnel spout B, preferably made from seamless brass or copper tubing, and gradually reduced by spinning from its largest diameter to its smallest diameter is substantially frustoconical or bottle shaped.

It comprises a tubular body 15 of comparatively large diameter at its lower end and at its upper end gradually tapering into a comparatively small diameter neck or spout 16, which, at its outer extremity, defines a restricted circular pouring opening 17. The body 15, adjacent its large diameter bottom, has its tubular wall turned outwardly and upwardly and then downwardly to form an outer annular groove 18, an inner groove 19 and a depending skirt or collar 21, which terminates in an inwardly and upwardly bent flange 22.

The cylindrical collar 21 has a larger internal diameter than the outer diameter of the cylindrical container body 11, and in order to provide for a liquid tight engagement between the collar and the container body, the collar is provided with an annular gasket or yielding element 23 of a thickness equal to or slightly in excess of the difference in these diameters.

The annular gasket 23 is preferably of rubber or other suitable resilient or yielding material and is secured in place within the collar 21 by crowding and crimping the gasket between the parts 18, 19 and 22.

It will be readily seen that instead of spinning the funnel spout B from seamless tubing, it may well be formed from a flat blank of any suitable sheet metal, in which case the edges of the blank would be joined in a side seam. Also, the collar 21 may be joined to the body 15 as a separate piece instead of being formed integrally with the body as is shown in the drawing.

The funnel spout B may be made in a number of different sizes and diameters to telescopingly and sealingly fit corresponding sizes and diameters of oil containers above referred to.

In order that the container A may be opened simultaneously with the inversion and telescoping of the funnel spout B over the container, the opening device or cutter C is secured in cutting position to the inner wall of the tubular funnel spout body 15.

The cutter C may take any of a number of suitable forms, the preferred form illustrated comprising a body or frame part having a cylindrical vertical wall 24 engaging the inner wall of the funnel body 15 and secured thereto in any suitable manner, as by spot welds 25. The vertical wall 24 merges into a horizontal shoulder or ledge 26, which in turn merges into a short vertical wall 27. So much of the opening device as has thus far been described is continuous within the spout body. Two cutter blades 28 extend down from the vertical wall 27. These blades 28 depend vertically at opposite sides of the cutter device and are arcuately curved or bowed outwardly and terminate in rounded and tapered, sharp cut edges 29, adapted to produce arcuate cuts in the top end of a filled oil container.

Associated with the frame part of the opening device C and reinforcing it, is a wall deflecting member 31, arranged diametrically across the wall 24, and having arcuate terminal flanges bent in opposite directions, supported by the annular shoulder 26 and secured to the inner surface of the wall 24. The metal of the deflecting member 31 is extended downwardly and outwardly at two opposite points and towards the centers of the respective blades 28, to provide curved deflecting arms 32, which terminate a little short of the cutting edges 29. The function of these arms 32 is to deflect or turn inwardly, as shown at 33, the uncut portions of the container top inside the lines of cut, thereby enlarging the openings produced by the cutting blades 28, and permitting rapid draining of the liquid from the container.

The recess formed by the parts 26 and 27 of the cutter and the wall of the body 15 may be utilized for the reception of an annular sealing gasket 34, which is preferably secured in place by crowding it into the recess.

The operation of the combination oil dispensing device and the steps of the method of dispensing are preferably as follows:

When a unit charge of oil of a certain requested brand is to be dispensed into the crank case of an automobile at a filling station, the attendant selects (preferably in full view of the purchaser) a filled, sealed and labeled oil container A of the desired size and brand, then selects the proper size funnel spout B, with cutter C therein, and inverts the wide, open end of the funnel spout over the top of the filled container, past the seam 13, so that the collar 21 assumes a position just below the seam, with the gasket 23 tightly embracing the cylindrical wall of the container body 11.

This initial positioning of the funnel spout brings the cutting edges 29 of the blades 28 of the cutter into proper alignment and engagement with the top end of the container.

Further downward forcing of the funnel spout causes the blades 28 to cut through the panel 14 and causes the arms 32 to deflect or curl inwardly the uncut portions of the panel 14, as clearly shown in Fig. 2, and this downward movement of the funnel and cutter is continued until the gasket lined shoulder 26 comes to a stop upon the top edge of the seam 13, when the cutting and deflecting operation is completed. The container A is now in effective, oil tight, sealing engagement with the funnel spout and cutter, and no oil can escape, except through the open cutting device C, and thence through the funnel spout when the container and funnel are tilted to pouring position, as illustrated in Fig. 3, where reference letter D indicates the filling neck of an automobile crank case. The oil is thus readily transferred from the container A, through the open cutter C, the funnel spout B, and into the filling opening of the crank case filling neck D.

Instead of merely resting the part 16 upon the part D, the funnel neck or spout 16 may be projected into the filling opening of the crank case a sufficient distance to hold the funnel B and attached container A in fully inverted, substantially vertical, pouring position without other support. The attendant may then leave the device in this position while he goes for another container and funnel. In order to permit the rapid draining of the oil, an air vent hole 35 (Fig. 3) is provided in the funnel spout body. The funnel neck or spout 16 is of such diameter and taper that it will readily fit the filling hole of any standard motor car from the smallest to the largest make.

Providing the funnel spout B with a self contained cutter C has several important advantages, i. e., separate opening devices such as the usual can openers, which are easily lost, mislaid or stolen, are eliminated; the cutter C is always at hand and ready for use and since the opening of the container and the application of the funnel spout are one combined, simultaneous operation, a separate operation, i. e., the opening of the oil container before the funnel spout is applied thereto, is eliminated.

Instead of permanently securing the cutter C to the inside of the funnel spout B, it may be removably secured, for example, by means of a nut and bolt connection.

After the container has been cut, spilling of oil is prevented by the gasket 34, provided the funnel be not tilted out of axial line with the container A; and if such tilting occurs in handling, transporting or pouring into and from the funnel, the gasket 23 is always in liquid-tight contact with the outside or cylindrical part of the container or top seam 13 and clings to the same and prevents any escape of oil along the exterior surface of the container. Tilting of the device out of axial alignment with the container is substantially prevented by the resilient element or gasket 23; thus, the latter serves not only as an auxiliary sealing element, but also tends to hold the device in proper alignment with the container to be opened.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An oil delivery device, comprising a funnel shaped body adapted to telescopically receive a portion of an oil container, said body having a sealing gasket located intermediate its ends and adapted to be engaged by the end of the received oil container, said body also being provided with a cutting element adapted to cut a pouring opening in said container portion and also provided intermediate said gasket and the end of said funnel body with a sealing element adapted to make liquid tight sealing engagement with the side wall of said container, thereby preventing escape of oil except through the open end portion of the container.

2. An oil delivery funnel, comprising a body portion and a spout portion, a cutting device and a sealing element in said body portion, said body portion being adapted to be inverted over a cylindrical double seamed oil container to be opened, said cutting device being adapted to cut a plurality of openings in said container as said body portion is moved over said container, said sealing element having an internal cylindrical surface adapted to have liquid tight contact with the outside of the container below its top double seam during the cutting operation.

3. An oil delivery funnel, comprising a body portion and a spout portion, a cutting device and a yielding element in said body portion, said body portion being adapted to be inverted over a double seamed oil container to be opened, said cutting device being adapted to cut a discharge opening in said container as said body portion is inverted thereover, said element having an internal yielding surface adapted to have sliding engagement with the outside of said container below the double seam thereof during the cutting operation.

4. A combined container opening and liquid dispensing device, comprising a body portion and a spout portion, said body portion having an open end adapted to receive an end portion of a liquid holding container, a cutter attached to the inner wall of said body portion between said spout and said open end and extending along said inner wall to adjacent said open end, said cutter being spaced from said wall between its point of attachment and said open end, a stop shoulder formed between said body portion and said cutter, a sealing gasket upon said shoulder, and yielding means between said sealing gasket and said open end for holding said device in axial alignment with said container.

CHARLES H. ERNE.